United States Patent

[11] 3,581,567

| [72] | Inventor | Albert Albisser<br>Boucherville, Quebec, Canada |
|---|---|---|
| [21] | Appl. No. | 804,223 |
| [22] | Filed | Mar. 4, 1969 |
| [45] | Patented | June 1, 1971 |
| [73] | Assignee | Molson Industries Limited-Les Industries<br>Molson Limitee<br>Montreal, Quebec, Canada |
| [32] | Priority | Dec. 23, 1968 |
| [33] | | Canada |
| [31] | | 038,528 |

[54] LIQUID LEVEL INDICATING DEVICE
1 Claim, 3 Drawing Figs.

[52] U.S. Cl. .................................................. 73/313,
73/308
[51] Int. Cl. ...................................................... G01f 23/10
[50] Field of Search ........................................... 73/313,
322, 308, 290 A, 319; 310/32 A, 49; 340/244 A;
335(Inquiry)74/29; 200/843

[56] References Cited
UNITED STATES PATENTS

| 1,582,600 | 4/1926 | Hayes ........................ | 73/319X |
| 2,386,643 | 10/1945 | Wallace ...................... | 73/290(A) |
| 2,437,203 | 3/1948 | McCandless ................ | 73/313 |
| 2,911,830 | 11/1959 | Binford ....................... | 73/319X |
| 3,111,033 | 11/1963 | Muzzi .......................... | 73/313X |

OTHER REFERENCES

Publ. " Nylon in Bearings & Gears" by W. C. Wall. Pages 102, 103 & 104. Product Engineering. July 1950 TJI P.93 73/317UX Primary Examiner—Louis R. Prince
Assistant Examiner—Daniel M. Yasich
Attorney—Cushman, Darby & Cushman ABSTRACT: A liquid level indicating device in which a float-rod member has a predetermined range of movement within a housing and carries a rack member and a magnetizable element. A rotary gear having a magnet is mounted on the housing and cooperates with the rack member in controlling the rotation of a potentiometer connected to the gear for signaling liquid level variations. The magnet and the magnetizable element cooperate to ensure that the gear will always be in the same position when it is engaged by the rack.

PATENTED JUN 1 1971

INVENTOR
ALBERT ALBISSER
BY CUSHMAN, DARBY & CUSHMAN
ATTORNEYS

LIQUID LEVEL INDICATING DEVICE

One of the steps in the art of brewing beer is to boil the wort in large brew-kettles which hold an average of 20,000 gallons and, during this time, to add measured amounts of hops by means of which beer is given its distinctive flavor.

As will be appreciated, it is important to have an accurate indication of the liquid level in the brew-kettle when the level is in the region of full to strike out. At present, the level is indicated by means of a float which floats on the surface of the liquid and which carries a rod which projects above the top of the kettle. Inasmuch as the rod is graduated, the liquid level is readily apparent. Between empty and full conditions, the amount of travel of the rod is approximately 15 feet but in practice, however, it is only necessary to know the level accurately over about the upper 14 inches.

Automation, however, is steadily taking place in the brewing industry and the problem which arises in this connection is to send an accurate level signal from the kettle to a control room situated in a different part of the brewery without using expensive and sophisticated equipment and it is the object of the present invention to provide a simple and relatively inexpensive device for accomplishing such an aim whilst still using the existing float and rod.

The invention is illustrated, by way of example, in the accompanying drawings in which.

Figure 1:
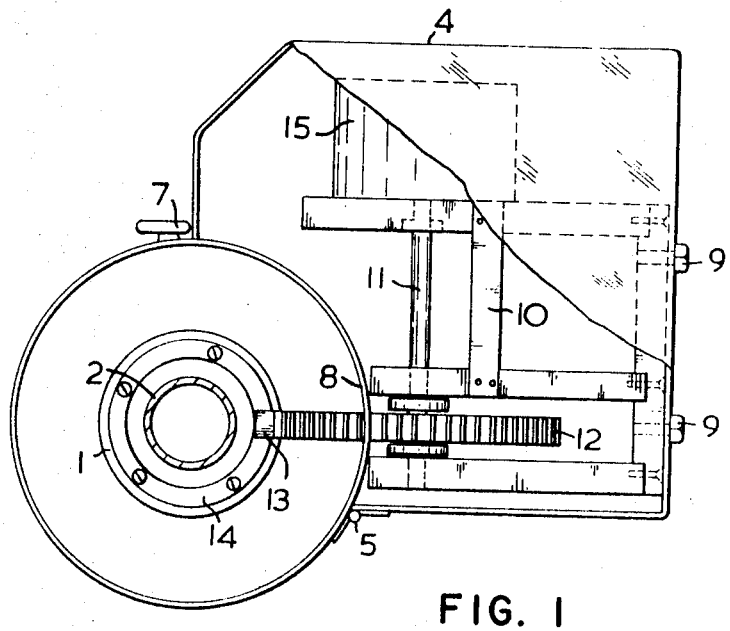
FIG. 1 is a plan view of the device partly in section.
Figure 2:
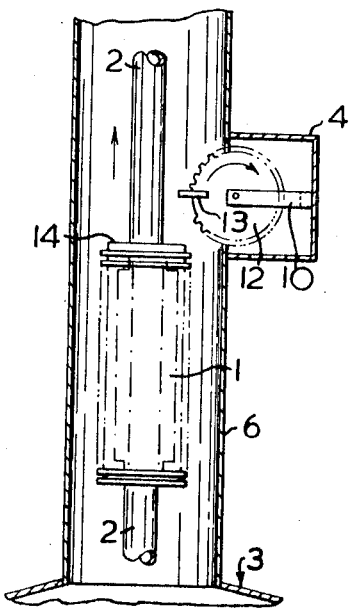
FIG. 2 is a part sectional diagrammatic view of the device showing its relation to the kettle.
Figure 3:
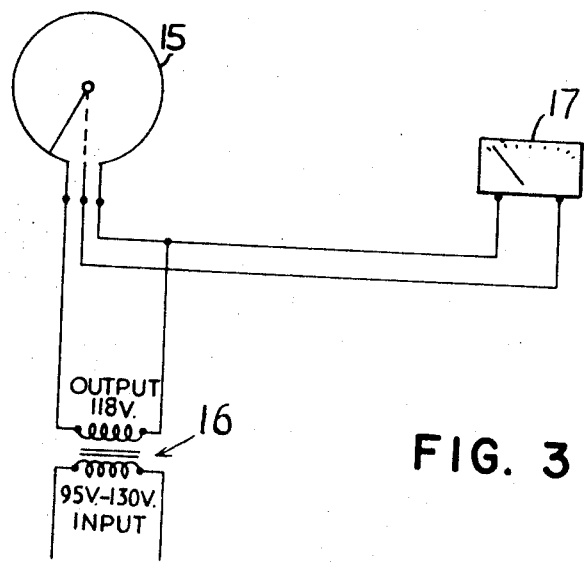
FIG. 3 is a circuit diagram.

Referring to the drawings, a rack 1, a little more than 14 inches long, is carried by that portion of a float rod or pipe 2 which just projects from the kettle, indicated generally at 3 (see FIG. 2), when the liquid level is within the upper part of the range for which an accurate level indication is required, the usual type of float (not shown) being mounted on the float rod 2. The float, and hence the rod 2, has a predetermined range of movement and the length of the rack 1 is less than said range.

A gear housing 4 is hingedly connected at 5 to the kettle casing 6, a catch 7 being provided on the latter so as to maintain the housing in closed operative position. The kettle casing 6 is also provided with a slot 8.

Mounted within the gear housing 4 by means of bolts 9 is a frame assembly 10 having a shaft 11 journaled therein and rotatably mounted adjacent one end thereof is a rotatable pinion 12. The pinion 12 projects through the slot 8 into the casing and carries a magnet 13 which cooperates with a magnetizable metal element, in the form of a steel washer 14, carried by the upper end of the rack 1 when the latter approaches said pinion 12.

The end of shaft 11, remote from the pinion 12, is connected to an electrical device or rotary potentiometer 15. The potentiometer 15 is connected across a constant AC voltage source such as a constant voltage supply regulator 16 which gives a constant output of 118 volts from a source which may vary between 95—130v. The variable output from the potentiometer 15 is connected to electrical indicating means, such as a calibrated voltmeter or indicator 17 located in the control room (not shown).

In operation and upon vertical movement of the rod 2, the pinion 12 mounted in the stationary gear housing 4 will always be in the same position when it is engaged by the rack 1 since the washer 14 riding up and down with the float rod 2 will always engage and disengage the magnet at the same position. Thus, inasmuch as the pinion 12 will always be in the same position when it is engaged by the rack 1 and rotated thereby, a constant initial reading on the potentiometer 15 is provided, and which is controlled by rotation of pinion 2, and hence, to voltmeter 17. Obviously, further variations in the vertical position of the rack 1 will be transmitted by the interengaging pinion 12, via potentiometer 15, to the voltmeter 17. Thus, the variable output of potentiometer 15 will be registered by the voltmeter 17 and the liquid level will thereby be indicated when the rack 1 is in engagement with pinion 12.

It will be appreciated that due to the cylindrical shape of rack 1, it will always engage with the pinion 12 regardless of the angular position of the float about a vertical axis. Preferably, both rack and pinion are formed from nylon.

I claim:

1. A liquid level indicating device including a member floatable on the surface of a liquid and having a predetermined range of movement; a rack carried by said member and having a length less than said range; a rotatable pinion mounted on a shaft and capable of being engaged by said rack and rotated thereby; means for ensuring said pinion is always in the same position when engaged by said rack; an electrical device controlled by rotation of said pinion; and electrical indicating means connected to said electrical device for registering the variable output of the latter whereby the angular movement of the shaft, when the rack is in engagement with the pinion, varies the electrical device, such variation being shown on the indicating means as an indication of the level of the liquid; said means for ensuring said pinion is always in the same position when engaged by the rack including a magnet on the pinion and a cooperating magnetizable metal element on an adjacent end of the rack, said magnet being located in the path of travel of said rack whereby magnet is attracted by said metal element as said rack approaches said pinion and prior to rotation of the latter.